(12) United States Patent
Mirza et al.

(10) Patent No.: US 8,010,942 B1
(45) Date of Patent: Aug. 30, 2011

(54) RESILIENT APPLICATION DESIGN AND DISPLAYING DESIGN PROFILE VIA GRAPHICAL USER INTERFACE

(75) Inventors: Nasir Mahmood Mirza, Overland Park, KS (US); Sameer Akbar Khan, Overland Park, KS (US); Usman Muhammad Naim, Overland Park, KS (US); Brajendra Singh Thakur, Overland Park, KS (US); Andrew L. Davey, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1150 days.

(21) Appl. No.: 11/681,811

(22) Filed: Mar. 5, 2007

(51) Int. Cl.
G06F 9/44 (2006.01)
G06F 9/45 (2006.01)

(52) U.S. Cl. .......... 717/109; 717/116; 715/762

(58) Field of Classification Search .......... 717/108–116; 715/700, 762
See application file for complete search history.

(56) References Cited

U.S. PATENT DOCUMENTS

| | | | | |
|---|---|---|---|---|
| 5,481,712 A * | 1/1996 | Silver et al. | | 717/109 |
| 5,872,974 A * | 2/1999 | Mezick | | 717/109 |
| 6,427,228 B1 * | 7/2002 | Wigger | | 717/111 |
| 6,502,234 B1 * | 12/2002 | Gauthier et al. | | 717/107 |
| 6,609,130 B1 * | 8/2003 | Saulpaugh et al. | | 717/116 |
| 6,697,086 B2 * | 2/2004 | Rosenberg et al. | | 715/700 |
| 6,738,964 B1 * | 5/2004 | Zink et al. | | 717/105 |
| 6,851,105 B1 * | 2/2005 | Coad et al. | | 717/106 |
| 7,030,890 B1 * | 4/2006 | Jouet et al. | | 345/619 |
| 7,200,838 B2 * | 4/2007 | Kodosky et al. | | 717/116 |
| 7,370,315 B1 * | 5/2008 | Lovell et al. | | 717/100 |
| 7,410,475 B2 * | 8/2008 | Krensky et al. | | 604/29 |
| 7,451,403 B1 * | 11/2008 | Srinivasan et al. | | 715/763 |
| 7,496,890 B2 * | 2/2009 | Miller et al. | | 717/107 |
| 7,506,304 B2 * | 3/2009 | Morrow et al. | | 717/109 |
| 7,530,052 B2 * | 5/2009 | Morrow et al. | | 717/113 |
| 7,533,347 B2 * | 5/2009 | Santori et al. | | 715/763 |
| 7,657,868 B2 * | 2/2010 | Shenfield et al. | | 717/107 |
| 7,689,923 B2 * | 3/2010 | Massasso et al. | | 715/762 |
| 7,827,527 B1 * | 11/2010 | Chiluvuri | | 717/109 |
| 7,840,937 B1 * | 11/2010 | Chiluvuri | | 717/106 |
| 7,861,178 B2 * | 12/2010 | Lui et al. | | 715/762 |

OTHER PUBLICATIONS

Vanderonckt et al, "Generative pattern based design of user interface", ACM PEICS, pp. 12-19, 2010.*
Chen et al, "Extraction and visualization of traceablity relationships between documents and source code", ACM ASE, pp. 505-509, 2010.*
Fernandez, "Model driven development of mobile applications", IEEE, pp. 509-512, 2008.*
Xie et al, "Designing and comparing automated test oracles for GUI based software applications", ACM Trans software eng. and methodology, vol. 16, No. 1, article 4, pp. 1-36, 2007.*

* cited by examiner

Primary Examiner — Anil Khatri (57) ABSTRACT

A method is provided for designing a service which is made up of one or more service applications in which availability definitions are displayed on a graphical user interface in the class selection process. The method involves displaying classes and class definitions on a graphical user interface, selecting a class for each of the service applications, displaying an availability definition for each of the selected classes, and prompting a user to confirm the selection of the class based on the availability definition. If the selection of the class is confirmed, a design profile indicating the resources required for the class is generated and displayed. If the selection of the class is not confirmed, the classes are redisplayed.

6 Claims, 7 Drawing Sheets

FIG. 1

CLASS DEFINITIONS (201)

| | CLASS 1 | CLASS 2 | CLASS 3 | CLASS 4 |
|---|---|---|---|---|
| ASPECT 1 | A | B | C | D |
| ASPECT 2 | E | F | G | H |
| ASPECT 3 | I | J | K | L |

AVAILABILITY MANAGEMENT DEFINITIONS (202)

| | CLASS 1 | CLASS 2 | CLASS 3 | CLASS 4 |
|---|---|---|---|---|
| ASPECT 1 | A | B | C | D |
| ASPECT 2 | E | F | G | H |
| ASPECT 3 | I | J | K | L |

DESIGN PROFILE (203)

| | CLASS 1 | CLASS 2 | CLASS 3 | CLASS 4 |
|---|---|---|---|---|
| ASPECT 1 | A | B | C | D |
| ASPECT 2 | E | F | G | H |
| ASPECT 3 | I | J | K | L |

```
┌─────────────────────────────────────────────────┐
│                                                 │
│         GRAPHICAL USER INTERFACE                │
│                   401                           │
│                                                 │
│      ┌───────────────────────────────────┐      │
│      │                                   │      │
│      │         CLASS DEFINITIONS         │      │
│      │               402                 │      │
│      │                                   │      │
│      └───────────────────────────────────┘      │
│                                                 │
│                                                 │
│      ┌───────────────────────────────────┐      │
│      │                                   │      │
│      │  AVAILABILITY MANAGEMENT DEFINITIONS  │   │
│      │               403                 │      │
│      │                                   │      │
│      └───────────────────────────────────┘      │
│                                                 │
│                                                 │
│      ┌───────────────────────────────────┐      │
│      │                                   │      │
│      │          DESIGN PROFILE           │      │
│      │               404                 │      │
│      │                                   │      │
│      └───────────────────────────────────┘      │
│                                                 │
└─────────────────────────────────────────────────┘
```

FIG. 4

| CLASS DEFINITIONS | | | | |
|---|---|---|---|---|
| | MOST CRITICAL | VERY CRITICAL | CRITICAL | NOT CRITICAL |
| NETWORK SERVICES | ESSENTIAL TO MISSION | ESSENTIAL TO BUSINESS FUNCTION | IMPORTANT TO BUSINESS FUNCTION | SUPPORT BUSINESS FUNCTION |
| APPLICATION FUNCTION | IN SERVICE PATH | CLOSE TO SERVICE PATH; MAJOR IMPACT ON REVENUE | IMPORTANT TO DAY TO DAY BUSINESS FUNCTION; IMPACTS INTERNAL ORGANIZATION FUNCTION | SUPPORT ANALYSIS AND REPORTING |
| BUSINESS IMPACT | LOST BUSINESS | LOST EFFECTIVENESS | LOST EFFICIENCY | ALTERNATIVES AVAILABLE |

FIG. 5

| AVAILABILITY MANAGEMENT | | | | |
|---|---|---|---|---|
| | MOST CRITICAL | VERY CRITICAL | CRITICAL | NOT CRITICAL |
| AVAILABILITY REQUIREMENTS | 99.999%-99.99% | 99.99%-99.95% | 99.95%-99.9% | 99.9%-99% |
| APPLICATION DOWNTIME | 5 MINUTES - 53 MINUTES | 53 MINUTES - 4.4 HOURS | 4.4 HOURS - 8.8 HOURS | 8.8 HOURS - 3.6 DAYS |
| RECOVERY POINT OBJECTIVE | < 5 MINUTES | 5 MINUTES < RPO < 1 HOUR | 1 HOUR < RPO < 4 HOURS | 4 HOURS < RPO < 1 DAY |
| RECOVERY TIME OBJECTIVE | < 1 HOUR | 1 HOUR < RTO < 6 HOURS | 6 HOURS < RTO < 1 DAY | 1 DAY < RTO < 3 DAYS |
| TYPICAL COST | 6X - 8X | 4X - 6X | 2X - 4X | X |

FIG. 6

| 404 | DESIGN PROFILE | | | |
|---|---|---|---|---|
| | MOST CRITICAL | VERY CRITICAL | CRITICAL | NOT CRITICAL |
| TYPICAL HARDWARE REQUIREMENTS | HIGH AVAILABILITY; HIGH SCALABILITY; REDUNDANT CONNECTIONS; SCALABLE PERFORMANCE; NON-DISRUPTIVE BACKUPS; RAPID RESTORE; HA BUSINESS CONTINUANCE; ADVANCED RECOVERY; REMOTE DATA FACILITIES; | HIGH AVAILABILITY; HIGH SCALABILITY; REDUNDANT CONNECTIONS; SCALABLE PERFORMANCE; NON-DISRUPTIVE BACKUPS; RAPID RESTORE. | HIGH AVAILABILITY; HIGH SCALABILITY; REDUNDANT CONNECTIONS; SCALABLE PERFORMANCE; NON-DISRUPTIVE BACKUPS; EXTERNAL HOTSITE. | SCALABLE; LOW COST |
| DATA CENTER | MULTIPLE (MIN = 2) | TWO | TWO | MINIMUM ONE |
| HARDWARE | REDUNDANT PER SITE | REDUNDANT PRIMARY SITE AND STAND ALONE SECONDARY SITE | STAND ALONE PER SITE | STAND ALONE |
| APPLICATION FAILOVER | LOCAL AND GEO CLUSTER | LOCAL AND GEO CLUSTER | LOCAL | NO FAILOVER |
| DATA RECOVERY | SYNCH AND ASYNCH REPLICATION; MIRROR; ON-SITE TAPE; OFF-SITE TAPE. | ASYNCH REPLICATION; MIRROR; ON-SITE TAPE; OFF-SITE TAPE. | HOST BASED REPLICATION; MIRROR; ON-SITE TAPE; OFF-SITE TAPE. | NO REPLICATION; MIRROR; ON-SITE TAPE; OFF-SITE TAPE. |
| CAPACITY MANAGEMENT | DAILY UTILIZATION REPORTS BY SERVER; QUARTERLY FORECASTING | DAILY UTILIZATION REPORTS BY SERVER; QUARTERLY FORECASTING | DAILY UTILIZATION REPORTS BY SERVER; QUARTERLY FORECASTING | MONTHLY UTILIZATION REPORTS BY SERVER; QUARTERLY FORECASTING |
| PERFORMANCE MANAGEMENT | PERFORMANCE METRIC ESTABLISHED; THRESHOLD EXCEPTIONS REPORTED DAILY | PERFORMANCE METRIC ESTABLISHED; THRESHOLD EXCEPTIONS REPORTED DAILY | PERFORMANCE METRIC ESTABLISHED; THRESHOLD EXCEPTIONS REPORTED DAILY | PERFORMANCE METRIC ESTABLISHED; THRESHOLD EXCEPTIONS REPORTED WEEKLY |

FIG. 7

RESILIENT APPLICATION DESIGN AND DISPLAYING DESIGN PROFILE VIA GRAPHICAL USER INTERFACE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to resilient application design for communication services.

2. Description of the Prior Art

Modern communication providers often times offer a wide variety of communications services to customers. For example, customers frequently purchase, subscribe to, or otherwise obtain voice calling, ring tone, text messaging, or Internet access services from communication providers.

As communication services have advanced, the ability for service providers to rapidly create and implement new services has also increased. In addition, the complexity of many services has increased. The rapid rate at which service providers desire to create and implement new services sometimes conflicts with the complexity of a new service.

Often times, a service utilizes service applications in order to deliver the service. It is common that service applications are provided by or on service resources, such as physical computing platforms. Typically, resources are assigned to service applications manually during the design process.

In many cases, service applications are assigned a class from a selection of classes in a range. For example, a service application could be rated one of most critical, very critical, average criticality, or less critical. In the prior art, the classes are defined in terms of a high level relationship between the application being classified and the significance of the application to the service or organization as a whole. Examples of class definitions include the general importance of an application to a network or a service, the function of the application or location of the function in a service path, and the business impact if the application were to fail.

In the past, a design profile would be generated and displayed for the service application based on the classification assigned to the application by design personnel. The design profile typically describes various implementation details that would be required of an application in a particular class, such as typical hardware, data center, application failover, and data recovery requirements.

Unfortunately, this approach often times results in applications having classifications that are inaccurate because the classification step is based on high level class definitions. The class definitions are not granular enough to assist the design personnel with determining a truly accurate application classification. As a result, design profiles are frequently detached from what is actually or optimally needed for any particular service application. When implemented, a service risks increased errors and problems if the design profiles supporting the service are not accurate.

SUMMARY OF THE INVENTION

Embodiments of the invention solve the above mentioned problems and other problems by integrating availability management information into the service design process. In an embodiment, a user is able to assign or otherwise select a high level class definition for an application. The user can then confirm or reconsider the selection in view of associated availability management information or definitions provided to the user.

For example, the availability management information or definitions of the design profile for the subject application can be compared to the actual performance of the underlying network on which an application or service will be implemented. In this manner, a user can determine during the design process whether a current network or system can support a proposed application at the class level desired by the user.

In an embodiment of the invention, a graphical user interface is operated to design a service. Classes and class definitions for each of the classes are displayed on a graphical user interface. A user selects a class for an application which will support the service and an availability definition associated with class is displayed. The user is prompted to confirm the selection of the class based on the availability definition associated with the class. If the selection of the class is confirmed, a design profile is generated and displayed which indicates the resources required for the class. If the selection of the class is not confirmed, the classes are redisplayed.

BRIEF DESCRIPTION OF THE DRAWINGS

The same reference number represents the same element on all drawings.

FIG. 7 illustrates a graphical representation of design profiles in an embodiment of the invention.

DETAILED DESCRIPTION OF THE PREFERRED EMBODIMENT

FIGS. 1-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
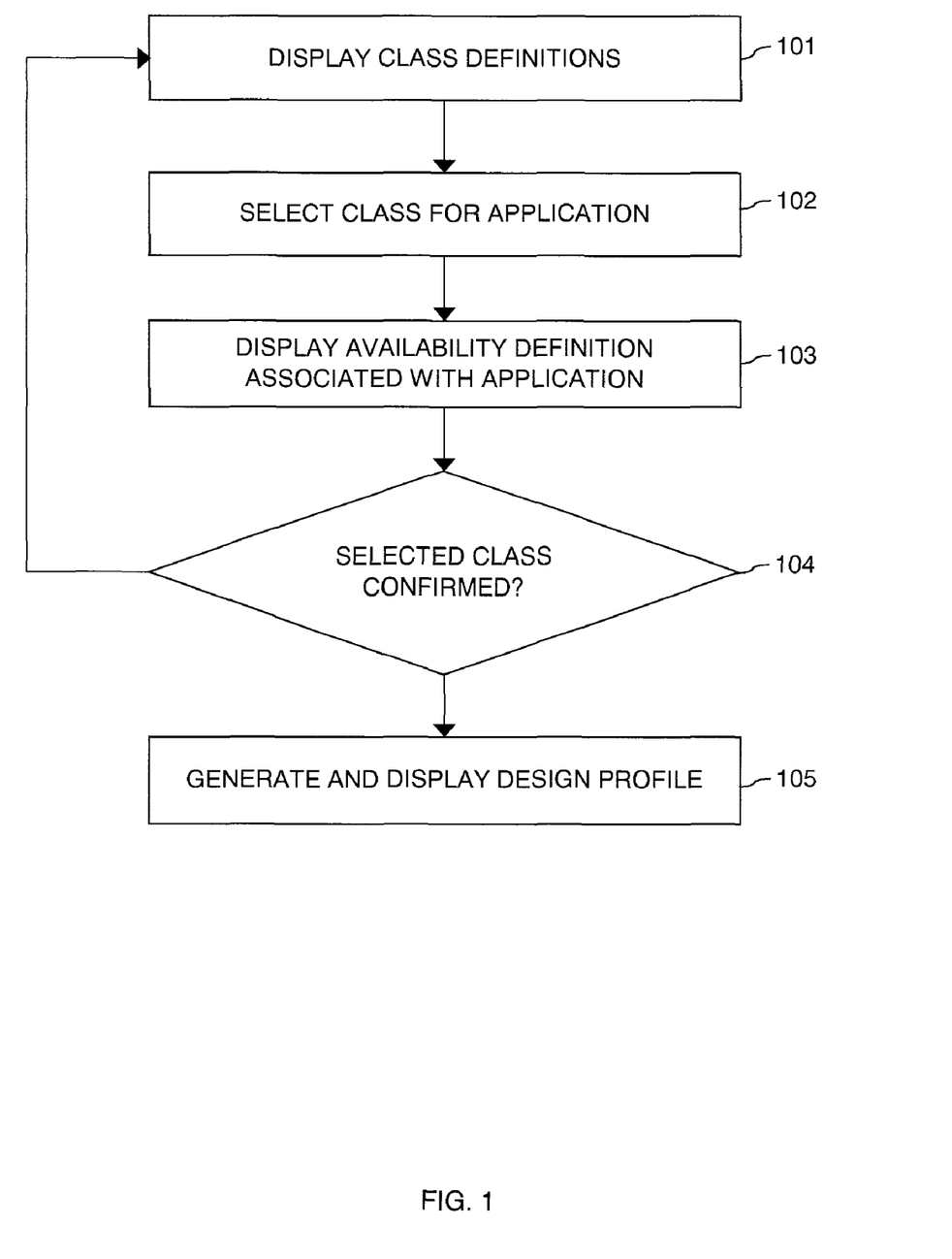
FIG. 1 illustrates a method in an embodiment of the invention.

FIG. 1 illustrates a method of operating a graphical user interface in an embodiment of the invention for designing a service. Typically, a service includes multiple software applications that are implemented on multiple physical resources. For example, a service may require applications running in the customer access layer, network access layer, service layer, and business applications layer. Each service application may run on a distinct type of physical resource, such as a server computer, a data storage system, or a general purpose computing platform.

Before a new service is implemented, such as ring tone, call tone, and text messaging services, the service must be designed. Importantly, a design profile must be generated for each application included in the service. Once aggregated, the application specific design profiles can be analyzed and processed to determine the effectiveness of a design, or to even implement the design.

As discussed above, prior art attempts to render design profiles included classifying service applications into categories of criticality, such as most critical, very critical, average criticality, and not critical. Based on the classification of the applications, a standard design profile would be applied to each application. For example, very critical applications may require redundant systems to support each application, whereas a non-critical application may be allowed to operate in a stand-alone fashion.

In a departure from the prior art, FIG. 1 illustrates an integration of availability management definitions into the operation of a graphical user interface. To begin, a graphical user interface implemented on a computer system displays class definitions to a user (Step 101). In general, the class definitions are high level descriptions of the relationship between an individual application and the service to which the application belongs. For example, the class definitions describe an application as essential, important, or merely support to or for a service. In many cases, an application could have various aspects that are related to the service. Thus, the class definitions are presented in multiple formats for each aspect of an application. A user can view the various definitions for each class as related to each aspect.

Figure 2:
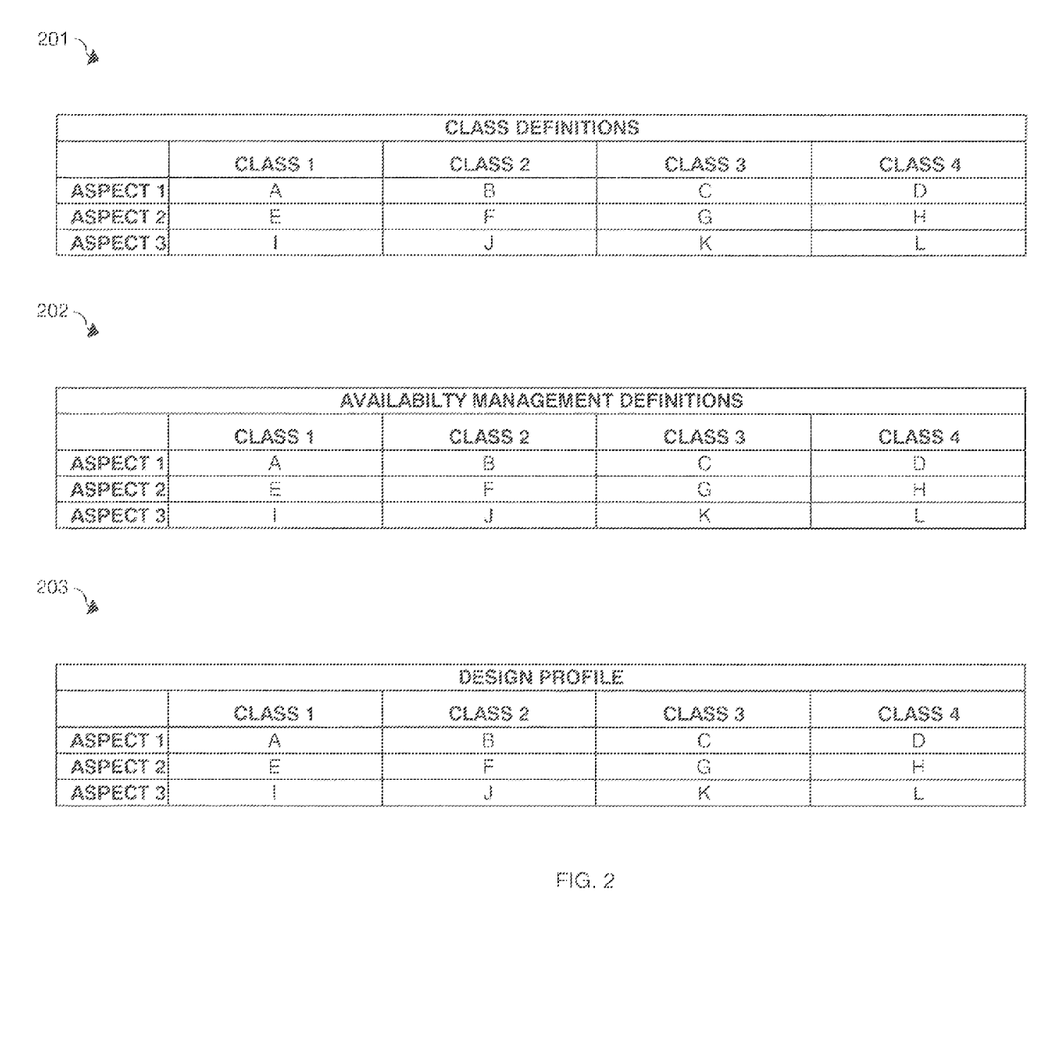
FIG. 2 illustrates graphical displays in an embodiment of the invention.

FIG. 2 illustrates an example of a graphical representation of class definitions 201 that could be displayed by the graphical user interface in Step 101. Class definitions 201 could be displayed in the form of a list, menu, pull-down menu, a spreadsheet, or the like. As illustrated in FIG. 2, multiple classes class 1, class 2, class 3, and class 4 could be defined for multiple aspects aspect 1, aspect 2, and aspect 3. The multiple aspects could describe aspects of the service application for which a design profile is desired. The definitions, A, B, C, D, E, F, G, H, I, J, K, and L could be definitions of each class with respect to each aspect. In other words, class 1 with respect to aspect 1 could be defined as A. Class 2 with respect to aspect 1 could be defined as B. Class 3 with respect to aspect 1 could be defined as C, and so on. In this manner, a user is presented with multiple different definitions for each class as related to an aspect of the service application for which a design profile is desired.

Next, the user via the graphical user interface selects a class for the application (Step 102). The user could select the class by mouse clicking on the desired definitions, selecting the class via a keyboard stroke, or by some other well known input. In an advance, the graphical user interface next displays availability management definitions associated with each class and each aspect respectively (Step 103). The user is presented with a graphical representation of availability management definitions 202 that are associated with each class definition. Availability management definitions 202 could be displayed in the form of a list, a menu, a pull down menu, a spreadsheet, or the like. For each class and aspect pair, an availability management definition is presented. It should be understood that, for each class, different availability management concepts or definitions could apply to each different aspect of an application. Thus, FIG. 2 illustrates that a separate availability management definition is displayed for each class and aspect pair.

Continuing with FIG. 1, the user is prompted by the graphical user interface to confirm the selected class (Step 104). The user may confirm or not confirm the previously selected class based on the availability management definitions associated with the class definitions that are displayed to the user. In an example, a user may determine to categorize or define the subject application as class 2 after viewing the definition F for class 2 with respect to aspect 2. After the selection of class 2, the availability management definitions for class 2 are displayed to the user. The user may view the availability management definitions to determine whether or not the subject application actually qualifies for class 2 in view of the added information provided by the availability management definitions.

In the event that the user confirms the initial selection of the class, a design profile 203 is generated and displayed by the graphical user interface (Step 105). Once again, the design profile describes or defines the design requirements for the application as classified in Step 101 above. The design profile 203 could be displayed in the form of a list, menu, pull-down menu, spreadsheet, or the like. Furthermore, the design requirements are described or defined with respect to each aspect of the service application. In the event that the user does not confirm the initial selection, the user is free to return to the class definition display Step 101 to re-classify the application. The process repeats until the proper class is selected and confirmed by the user.

In an advantage over the prior art, the above described embodiment provides a user with availability management definitions after the user classifies an application. The user can utilize the availability management definitions to confirm an application classification. The improved process provides resiliency to an end result design profile. As the service to which an application belongs is implemented, the chance or likelihood for error is reduced.

In another embodiment, the availability management information or definitions or the design profile for the subject application can be compared to the actual performance of the underlying network on which an application or service will be implemented. In this manner, a user can determine during the design process whether a current network or system can support a proposed application at the class level desired by the user.

Figure 3:
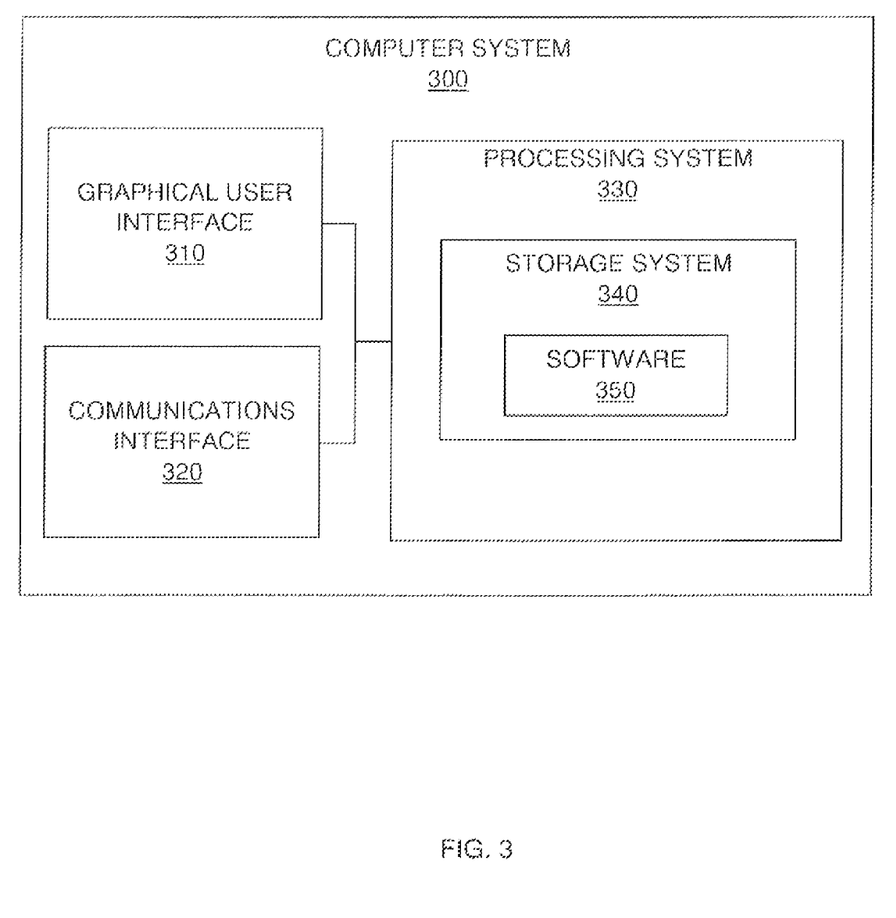
FIG. 3 illustrates a computer system in an embodiment of the invention.

FIG. 3 illustrates computer system 300 in an embodiment of the invention. Computer system 300 includes graphical user interface 310, communication interface 320, processing system 330, storage system 340, and software 350. Storage system 340 stores software 350. Processing system 330 is linked to interface 320. Computer system 300 could be comprised of a programmed general-purpose computer, although those skilled in the art will appreciate that programmable or special purpose circuitry and equipment may be used. Computer system 300 may use a client server architecture where operations are distributed among a server system and client devices that together comprise elements 310-350.

Graphical user interface 310 could be any software, hardware, or combination thereof capable of interfacing with a user. Graphical user interface 310 could display information to the user and receive input from the user. Graphical user interfaces are well known in the art.

Communication interface 320 could comprise a network interface card, modem, port, or some other communication device. Communication interface 320 may be distributed among multiple communication devices. Communication interface 330 could comprise a computer microprocessor, logic circuit, or some other processing device. Processing system 330 may be distributed among multiple processing devices. Storage system 340 could comprise a disk, tape, integrated circuit, server, or some other memory device. Storage system 340 may be distributed among multiple memory devices.

Processing system 330 retrieves and executes software 350 from storage system 340. Software 350 may comprise an operating system, utilities, drivers, networking software, and other software typically loaded onto a general-purpose computer. Software 350 could also comprise an application program, firmware, or some other form of machine-readable processing instructions. When executed by the processing system 330, software 350 directs processing system 330 to operate as described above for the method for operating a graphical user interface.

Figure 4:
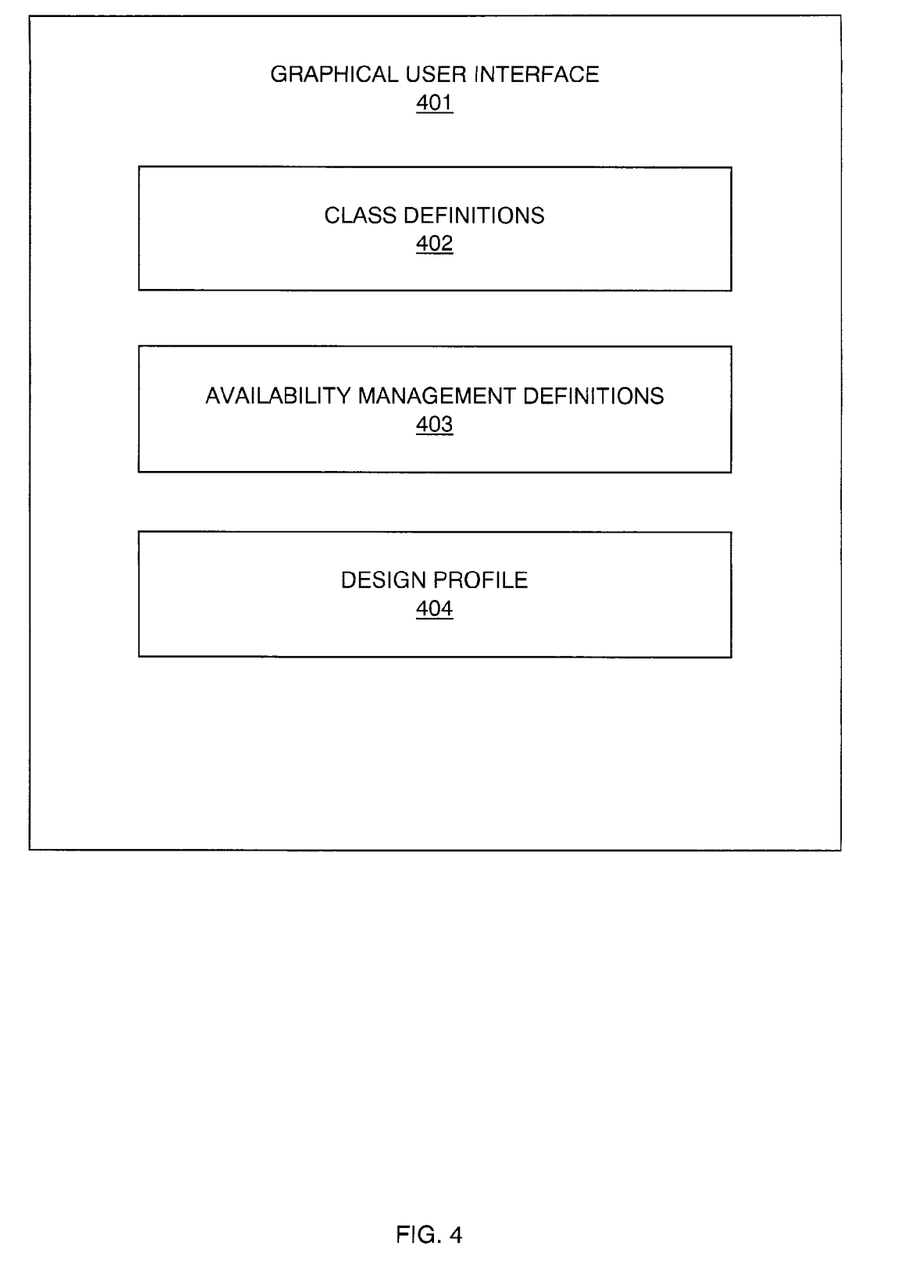
FIG. 4 illustrates a graphical user interface in an embodiment of the invention.

FIG. 4 illustrates a graphical user interface 401 in an embodiment of the invention. Graphical user interface 401 could be implemented on any well known computer system. Graphical user interface 401 includes a display of class definitions 402, a display of availability management definitions 403, and a design profile 404.

Figure 5:
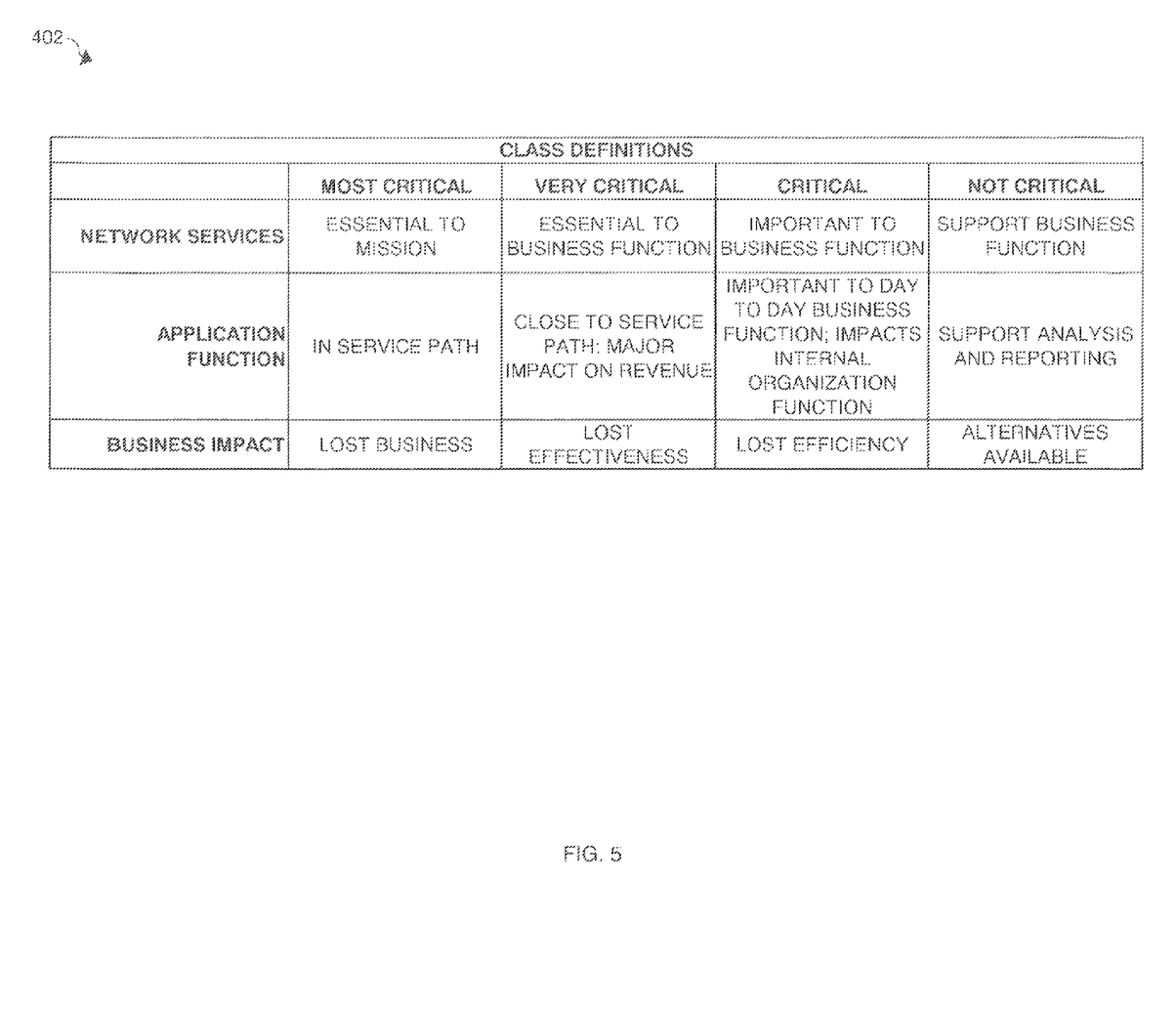
FIG. 5 illustrates a graphical representation of class definitions in an embodiment of the invention.

FIG. 5 illustrates a detailed example of class definitions 402. As illustrated, the class definitions could define each combination of class and application aspect. The four classes could be most critical, very critical, critical, and not critical. The three aspects could be network services, application function, and business impact.

In this example, it should be understood that any service application for which a design profile is sought could possibly have several different aspects or points of view to the application. In this example, three aspects are provided as network services, application function, and business impact. Thus, the criticality of an application could be defined in terms of the relation of the application to network services, to application function, or in terms of the business impact of the application.

As illustrated, an application could be considered most critical if, from the aspect of network services, the application is essential to the mission of network services. The application could be considered very critical if, from the aspect of network services, the application is essential to the business function of network services. The application could be considered just critical if, from the aspect of network services, the application is important to the business function of network services. The application could be considered not critical from the aspect of network services if the application only supports a business function.

As further illustrated, an application could be considered most critical, very critical, critical, or not critical if, from the aspect of application function, the application is respectively in the service path of the service, is close to the service path and has a major impact on revenue, is important to day to day business functions or impacts internal organization function, or supports analysis and reporting.

An application could be considered most critical, very critical, critical, or not critical if, from the aspect of business impact, failure of the application could result in lost business, lost effectiveness, lost efficiency, or if alternatives are available respectively.

Figure 6:
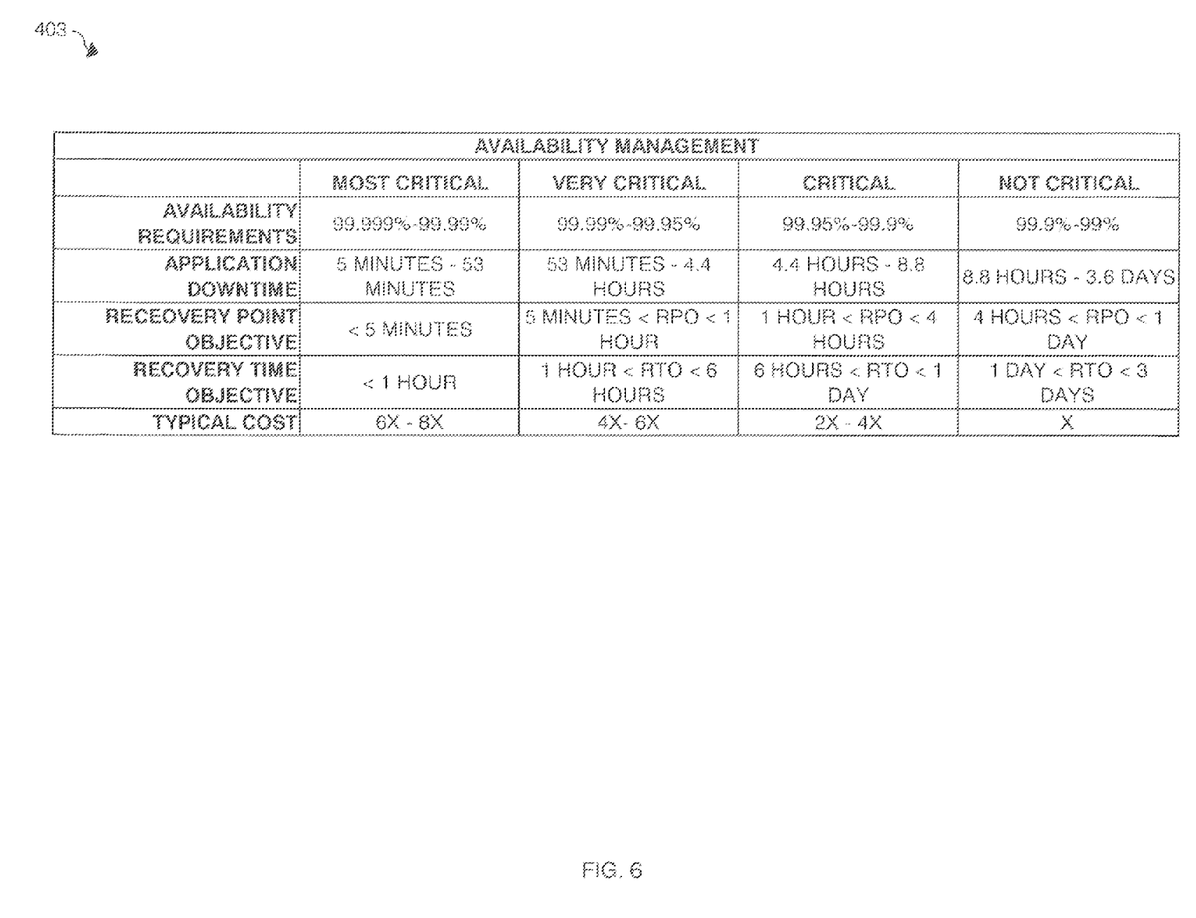
FIG. 6 illustrates a graphical representation of availability management definitions in an embodiment of the invention.

As discussed above, a user could initially select a class, such as most critical, very critical, critical, or not critical, based on the high level definitions provided in by the class definitions 402. A computer system running or otherwise executing the graphical user interface could then generate and display availability management definitions 403, as illustrated in FIG. 6. Based on the user's initial selection, the user could confirm or not confirm his class selection based on the added information contained in the availability management definitions 403.

In this embodiment, an application could be confirmed to be most critical, very critical, critical, or not critical if, from the aspect of availability requirements, the application must be available 99.999%-99.99%, 99.99%-99.95%, 99.95%-99.9%, or 99.9%-99% of the time, respectively.

Further in this embodiment, an application could be confirmed to be most critical, very critical, critical, or not critical if, from the aspect of application down time, the application must only be down on an annual basis 5-53 minutes, 53 minutes-4.4 hours, 4.4 hours-8.8 hours, or 8.8 hours-3.6 days respectively.

Further in this embodiment, an application could be confirmed to be most critical, very critical, critical, or not critical if, from the aspect of recovery point objective, the application must be recovered in the event of failure to within 5 minutes, between 5 minutes and 1 hour, between 1 hour and 4 hours, or between 4 hours and 1 day respectively.

Further in this embodiment, an application could be confirmed to be most critical, very critical, critical, or not critical if, from the aspect of recovery time objective, the application must be recovered in the event of failure in 1 hour, between 1 hour and 6 hours, between 6 hours and 1 day, and between 1 day and 3 days respectively.

Further in this embodiment, an application could be confirmed to be most critical, very critical, critical, or not critical if, from the aspect of typical costs, the cost is 6X-8X, 4X-6X, 2X-4X, or X times a base cost respectively.

FIG. 7 illustrates a design profile that could result from a class selection and assignment to an application by a user. As illustrated, a design profile could display, depending upon the class selection, various aspects of a design for an application based on the class selection. In this example, the physical resources required for a particular application are displayed. The aspects displayed could include typical hardware requirements, data centers, hardware, application failover, data recovery, capacity management, and performance management. Other physical resources are possible.

In this example, typical hardware requirements of a most critical application are high availability, high scalability, redundant connections, scalable performance, non-disruptive backups, rapid restore, business continuance, advanced recovery, and remote data facilities.

Further in this example, typical hardware requirements of a very critical application are high availability, high scalability, redundant connections, scalable performance, non-disruptive backups, and rapid restore.

The typical hardware requirements in this example of a critical application are high availability, high scalability, redundant connections, scalable performance, non-disruptive backups, and an external hot site. The typical hardware requirements of a not-critical application are that the hardware be scalable and low cost.

From the aspect of data centers, a most critical application could require multiple data centers, and at a minimum, two data centers. A very critical application could require two data centers. Likewise, event a critical application could require two data centers. A non-critical application would only require one data center.

From the aspect of hardware, a most critical application could require redundancy of the application at each site where the application is installed. A very critical application could require a redundant primary site and a stand alone secondary site. A critical application could require a stand alone application per site. A not-critical application would only require a single stand alone application.

With respect to application failover, a most critical application could require local and geographical clusters, as would a very critical application. A critical application could require a local application failover. A not-critical application would not require a failover.

With respect to data recovery, a most critical application could require synchronous and asynchronous replication, mirroring, on-site tape, and off-site tape. A very critical application could require asynchronous replication, mirroring, on-site tape, and off-site tape. A critical application could require hot-based replication, mirroring, on-site tape, and off-site tape. A not-critical application would not require any data recovery, except possibly on or off-site tape.

From the aspect of capacity management, a most critical application could require daily utilization reports by server and quality forecasting. Likewise, a very critical application could require daily utilization reports by a server and quality forecasting. Similarly, a critical application could require daily utilization reports by a server and quality forecasting. A not-critical application may require monthly utilization reports by server and quarterly forecasting.

From the aspect of performance management, a most critical application could require performance metrics established and threshold exceptions reported daily. A very critical application could also require performance metrics established and threshold exceptions reported daily. A critical application could also require performance metrics established and threshold exceptions reported daily. A not-critical application could also require performance metrics established and threshold exceptions reported weekly.

Those skilled in the art will appreciate variations from these embodiments that fall within the scope of the invention. Those skilled in the art will appreciate that the features described above could be combined in various ways to form multiple embodiments of the invention. As a result, the invention is not limited to the specific embodiments described above, but only by the claims and their equivalents.

The invention claimed is:

1. A method for designing a service comprising a plurality of service applications, the method comprising:
    displaying via a graphical user interface a plurality of classes and a plurality of class definitions for each class of the plurality of classes respectively;
    selecting a first class of the plurality of classes to classify a first application of the plurality of service applications;
    displaying an availability definition associated with the first class;
    prompting a user to confirm the selection of the first class based on the availability definition associated with the first class;
    if the selection of the first class is confirmed, generating and displaying a design profile indicating a plurality of resources required for the first class; and
    if the selection of the first class is not confirmed, displaying via the graphical user interface the plurality of classes and the plurality of class definitions for each class of the plurality of classes respectively; wherein the instructions, when executed by the processing system, further direct the processing system to display via the graphical user interface the plurality of class definitions for each combination of the plurality of classes and the plurality of aspects.

2. The method of claim 1 further comprising displaying a plurality of aspects of the plurality of service applications.

3. The method of claim 1 wherein the plurality of classes comprises a most critical class, a very critical class, a critical class, and a non-critical class.

4. A software product for designing a service comprising a plurality of service applications, the software product comprising:
    a non-transitory computer readable storage medium having stored thereon instructions that, when executed by a processing system, direct the processing system to:
        display via a graphical user interface a plurality of classes and a plurality of class definitions for each class of the plurality of classes respectively;
        receive a user selection from a user via the graphical user interface of a first class of the plurality of classes to classify a first application of the plurality of service applications;
        display via the graphical user interface an availability definition associated with the first class;
        prompt the user via the graphical user interface to confirm the selection of the first class based on the availability definition associated with the first class;
        if the selection of the first class is confirmed, generate and display via the graphical user interface a design profile indicating a plurality of resources required for the first class; and
        if the selection of the first class is not confirmed, display via the graphical user interface the plurality of classes and the plurality of class definitions for each class of the plurality of classes respectively; wherein the instructions, when executed by the processing system, further direct the processing system to display via the graphical user interface the plurality of class definitions for each combination of the plurality of classes and the plurality of aspects.

5. The software product of claim 4 wherein the instructions, when executed by the processing system, further direct the processing system to display a plurality of aspects of the plurality of service applications.

6. The software product of claim 4 wherein the plurality of classes comprises a most critical class, a very critical class, a critical class, and a non-critical class.

* * * * *